Oct. 14, 1969 G. B. McGOUGH 3,472,974

PUSHBUTTON SWITCH ACTIVATED BY A SLIDE WITH A PLURALITY OF TOGGLE JOINTS AND CAMS

Filed Sept. 25, 1967 2 Sheets-Sheet 1

INVENTOR.
GERALD B. McGOUGH

BY Bernard E. Franz

ATTY.

INVENTOR.
GERALD B. McGOUGH

BY Bernard E. Franz

ATTY.

United States Patent Office 3,472,974
Patented Oct. 14, 1969

3,472,974 PUSHBUTTON SWITCH ACTIVATED BY A SLIDE WITH A PLURALITY OF TOGGLE JOINTS AND CAMS

Gerald B. McGough, Elmhurst, Ill., assignor to Automatic Electric Laboratories, Inc., Northlake, Ill., a corporation of Delaware Filed Sept. 25, 1967, Ser. No. 670,115
Int. Cl. H01h 9/26
U.S. Cl. 200—5 2 Claims

ABSTRACT OF THE DISCLOSURE

A pushbutton controlled mechanism to selectively close certain contacts and simultaneously actuate a set of common contacts upon the depression of one of a plurality of upwardly biased pushbuttons. A slide having a plurality of articulated toggle joints positioned in the channel below and common to a plurality of pushbuttons and a spring positioned at one end of the slide urges the pushbuttons upwardly. Depression of any pushbutton opens the toggle joint arrangement moving the slide longitudinally, compressing the spring and activating a common contact; and the cams associated with the toggle joint close the selected sets of contacts.

BACKGROUND OF THE INVENTION

Field of the invention

This invention relates to apparatus for transmitting a plurality of signals, and more particularly to an improved construction for a push-button type call transmitter which may be used, by way of example, in a telephone set such as disclosed in U.S. Patent 3,284,577 to R. V. Burns et al., and assigned to the assignee of this application.

Description of the prior art

Representative telephone pushbutton call transmitters are disclosed in U.S. Patent 3,316,357 to J. H. Ham et al. and in U.S. Patent 3,210,484 to J. W. Dorsey. These call transmitters are constructed in such a manner that a plurality of pushbuttons protrude through a cover member by means of holes provided therein, each button being associated with a different digit which is characterized by two unique frequencies. Each pushbutton is biased toward the extended position in its unoperative mode and depression of the pushbutton generates, by means of contacts provided therein, a digit associated with the respective pushbutton.

Each pushbutton in the prior art arrangements is generally provided with individual means to return it to its normal or extended position upon releasing of the finger pressure from the depressed position of the pushbutton. In these prior call transmitters each pushbutton is associated with a return spring. The use of individual return springs requires specially shaped pushbuttons and spring anchoring in order to retain the return spring in its operable location. Therefore known call transmitters involve numerous parts and require many assembly operations.

SUMMARY OF THE INVENTION

One object of the present invention is to provide an improved construction minimizing assembly operations for a pushbutton call transmitter.

Another object of the invention is to provide a pushbutton call transmitter of simpler construction than the designs of the prior art.

A feature of the invention provides a pushbutton device in which return of a pushbutton to its normal unoperated position is accomplished by a member which is common to a plurality of pushbuttons and which also performs other functions.

This invention is embodied in a telephone pushbutton call transmitter which comprises a cover member having a plurality of holes therein arranged in an array of longitudinal columns and transverse rows, and a base assembly. An individual pushbutton is placed in each of the holes in the cover member, each pushbutton being associated with a different digit which is characterized by two unique frequencies and each button further being movable between a normal extended position and a depressed position and being biased toward its extended position.

Each longitudinal column of the plurality of holes in the cover member, with the pushbuttons inserted therein is associated with a slide. Each slide, comprising a plurality of articulated toggle joints, is slidably positioned in a channel provided on the top surface of the base frame below its respective longitudinal column of the pushbuttons. The knee of each toggle joint abuts against the bottom of its associated pushbutton. One end of the slide is secured from movement while the other is spring loaded. The tension of the spring keeps the toggle joint knees pressed against the bottom surface of the pushbuttons, so that all the pushbuttons of that longitudinal column maintain their upward or extended position. Upon depression of any pushbutton, the force applied to the knee of its associated toggle joint tends to straighten the toggle joint arrangement so the legs assume a nearly straight line position. The channel and the other pushbuttons in the column prevent other toggle joint knees from moving upward allowing the slide to move toward the spring loaded end. When the pressure from the actuated pushbutton is removed, the tension of the spring compresses the toggle joint, thus forcing the pushbutton to its upward position. The horizontal or longitudinal movement of any slide in the call transmitter acuates a common switch by means of a cam positioned at the spring loaded end of the slide.

Each toggle joint has a pair of cams formed on the inside wall of one of its legs. The cams act on a set of its associated spring contacts, provided in the base assembly, for selecting a pair of discrete frequencies. Thus, upon actuation of any one of the pushbuttons of any longitudinal column, horizontal travel of the slide operates a common switch, and the cam of the toggle joint closes two particular sets of spring contacts to select two particular frequencies.

The invention and its advantages will be more fully understood from the following description when considered with the accompanying drawings, in which:

FIG. 9 is a sectional view taken along line 9—9 of

Figure 1:
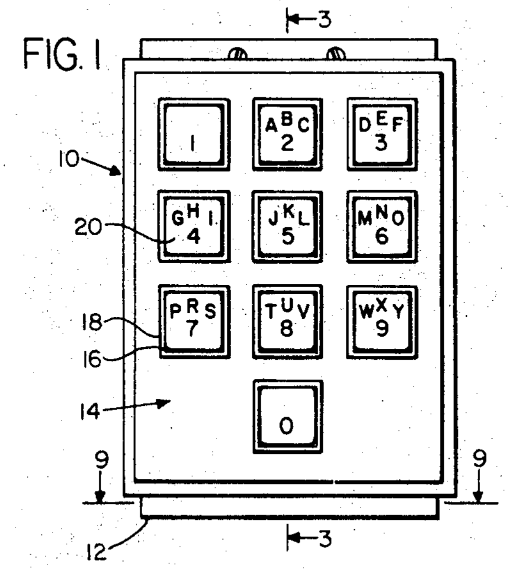
FIG. 1 is a top view of a call transmitter device showing the pushbutton arrangement of this invention.
Figures 5, 6, 7, 8, 10:
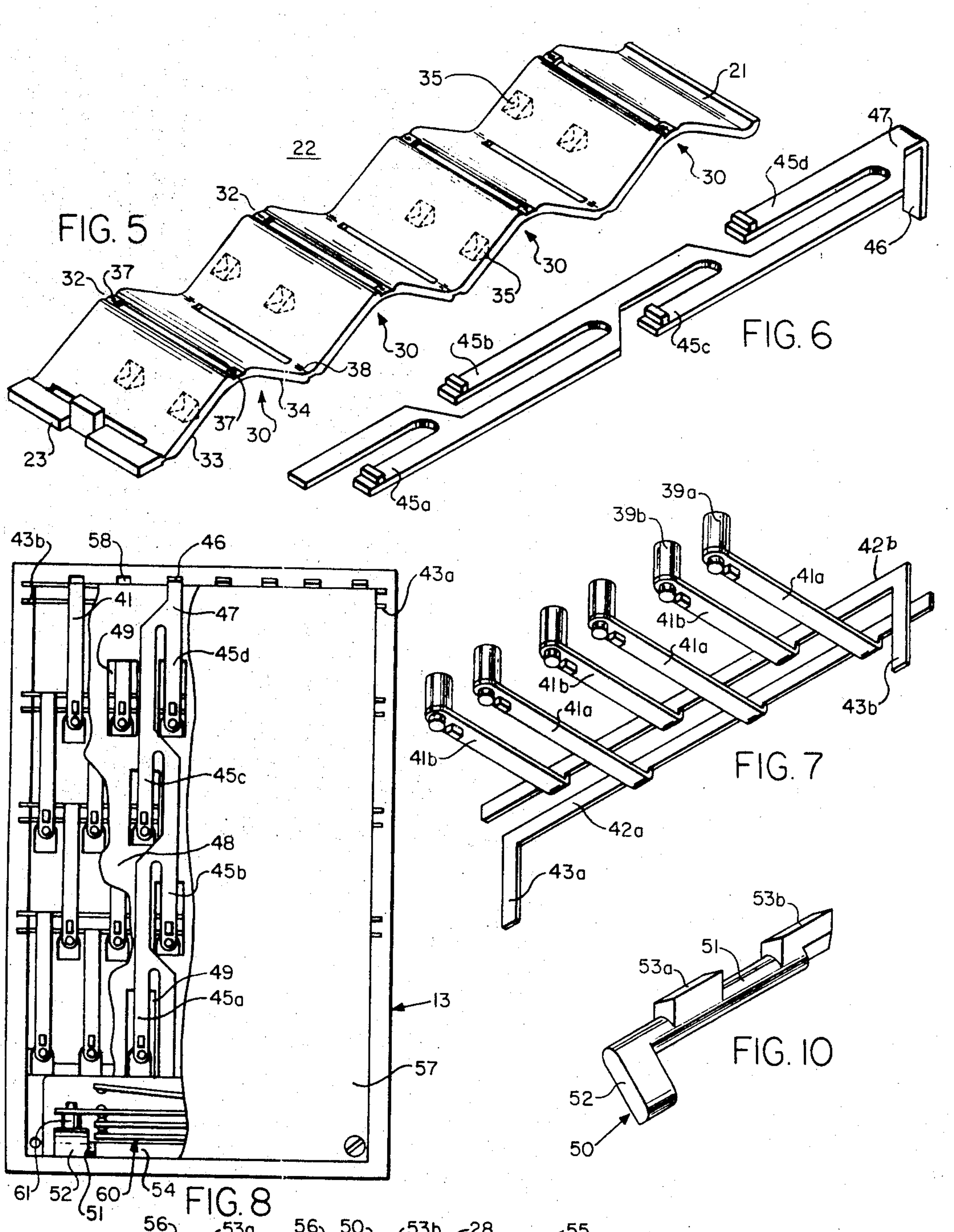
FIG. 5 is a perspective view of the slide structure of the call transmitter.
FIG. 6 is a perspective view of the longitudinally mounted spring of the frequency selecting spring set.
FIG. 7 is a perspective view of the transversally mounted springs of the frequency selecting spring set.
FIG. 8 is a bottom view of the call transmitter assembly with portions of the bottom cover plate and spring separating plate broken away.

FIG. 1 showing how the slide tension springs and the common switch actuator are kept in position; and FIG. 10 is a perspective view of the common switch actuator.

DESCRIPTION OF THE PREFERRED EMBODIMENT

Referring now to the drawings, FIG. 1 shows a call transmitter 10 embodying the present invention. The transmitter 10 comprises a base assembly 12 and a cover member 14 having ten square apertures 16 therein. Each of the apertures is surrounded by a guide collar 18, the collars being square and extending from the upper surface of the cover member 14. The apertures 16 are arranged in an array of longitudinal columns and transverse rows, and each has a square pushbutton 20 slidably inserted therein. Each pushbutton 20 represents a distinct frequency combination. By depressing one or more pushbuttons in a particular sequence the required signal is transmitted.

Figure 2:
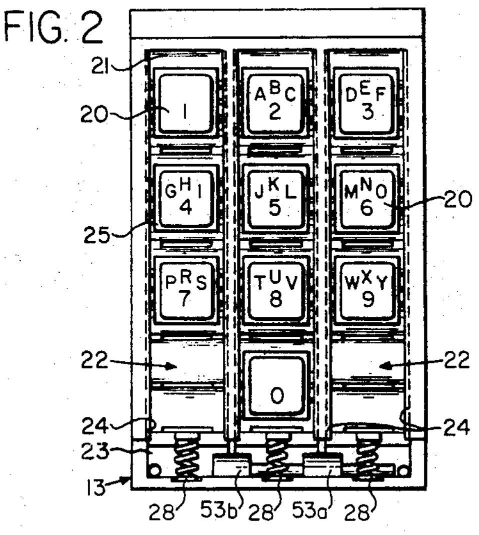
FIG. 2 is a top view of a call transmitter device with the cover member removed.
Figure 3:
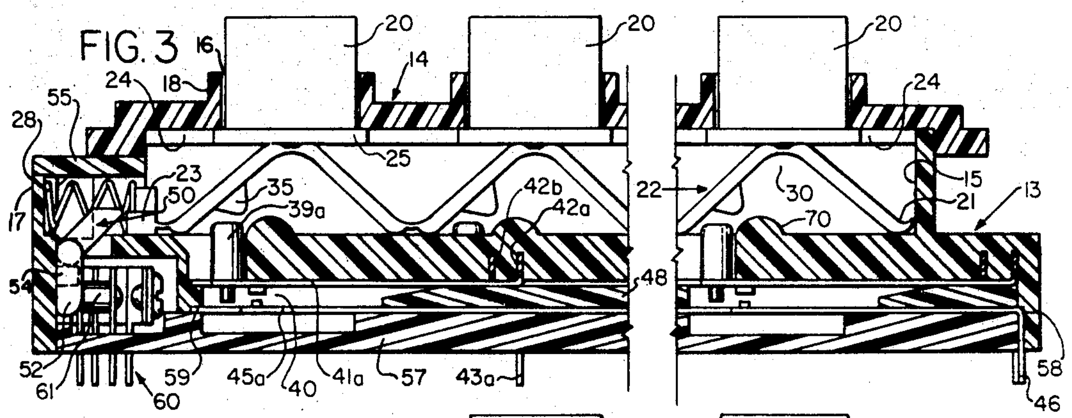
FIG. 3 is an enlarged cross-sectional view taken along line 3—3 of FIG. 1 showing the pushbutton mechanism in its normal unoperated position.

Turning now to FIGS. 2 and 3, the call transmitter 10 further comprises a plurality of slides 22 each inserted into a corresponding channel 24 in the base frame 13 of base assembly 12. Each slide 22 is associated with a longitudinal column of pushbuttons 20. One end 21 of the slide 22 abuts against the wall 15 of the base frame 13, while the other end 23 of the slide has a return spring 28 separating it and wall 17 of the base frame 13.

The slide 22, shown in FIG. 5, is preferably formed of a unitary piece of molded plastic material, such as polypropylene plastic, and comprises a plurality of rectangular segments connected together by integrally molded thin webs. There are two narrow webs, one on each side, separated by a slot. The slot provides greater flexibility between the two segments in that the webs are narrower. Polypropylene plastic material is particularly attractive since it has the mechanical strength necessary for a device of this type, and also has sufficient flexibility and durability to facilitate molding segments to each other by means of integrally molded webs.

As viewed from the side, it will be noted that the rectangular segments are substantially thicker than the connecting webs. When the segments are arranged in line, the webs 37 and 38 connect the segments alternately, first in one plane, then the other. The corners of the segments in the plane opposite that having webs are rounded. The provision of connecting webs in alternate planes allow the slide to fold accordion fashion when the slide is compressed horizontally, thus forming a plurality of articulated toggle joints. A toggle joint is a device consisting of two bars or segments joined together end to end but not in line, so that when a force is applied to the knee tending to straighten the arrangement, the parts abutting or joined to the ends of the bars will experience an endwise pressure. The toggle joints of the present invention each consist of two rectangular segments 33 and 34, hereafter called legs, hinged together at their transverse edges by webs 37 to form a knee 32. The toggle joints 30 are hinged together at the ends opposite of the knee 32 by webs 38. Associated with each toggle joint 30 is a pair of cams 35 integrally molded to the inside wall of leg 33. With the slide constrained against sidewise movement by channel 24, the return spring 28 urges the toggle joints 30 into their most contracted mode; that is, the legs 33 and 34 define a maximum elevation angle with the bottom of channel 24. Each knee 32 buts against the under surface of an associated pushbutton 20, and normally urges all pushbuttons upward to their unoperated position. Although in this embodiment the end spring 28 is provided for keeping the toggle joints in their most contracted position within the channel, it is envisioned within the concepts of this invention that the slide can be so constructed as not to require said spring. This can be achieved by the use of pre-tensioned members between the two adjacent segments. Each pushbutton 20 is formed with a square flange 25 of slightly larger dimensions that the pushbutton which engages the under surface of the cover member 14 around apertures 16 so as to limit the upward travel of the pushbuttons.

Figure 9:
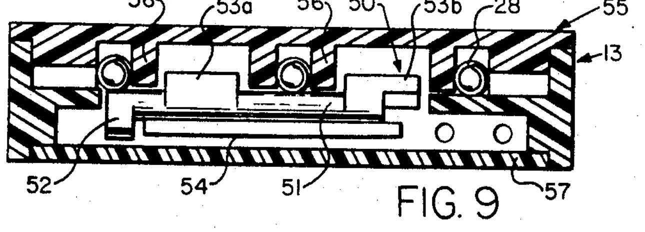

Mounted adjacent and parallel to end wall 17 of base frame 13 is a common switch actuator 50, which comprises, as best seen in FIG. 10, a shaft 51, a cam 52 extending from one end of shaft 51, and a pair of similarly oriented cams 53*a* and 53*b* extending from the shaft at an oblique angle to cam 52. As shown in FIG. 9, the actuator 50 is positioned in a slot provided in the base frame 13 and is held at the bottom by a bar 54 attached to wall 17. A cover plate 55 holds the actuator in position by depending studs 56. The actuator cam 52 protrudes through the slot in the base frame to contact a buffer 61 of the common switch 60. Both of cams 53*a* and 53*b* extend above the surface of the base frame and abut against ends 23 of the slides 22. Since the call transmitter 10 uses three slides 22, cams 53*a* and 53*b* are spaced sufficiently apart so that the center slide may be provided with the return spring 28 and yet abut against a portion of both cams. The end slides 22 each abut only one cam with the left hand slide abutting a portion of cam 53*b* and the right hand slide abutting a portion of cam 53*a*. Thus, when any pushbutton 20 is depressed the longitudinal or horizontal movement of the associated slide caused thereby forces cams 53*a* and 53*b* toward the wall 17. The cam 51 rotates causing cam 52 to rotate away from wall 17, and to engage and activate common switch 60. The contact spring has a buffer 61, pretensioned to return the actuator 50 to its normal condition when the horizontal pressure against cams 53*a* and 53*b* is removed.

Each toggle joint 30 is associated with two pairs of normally open frequency selecting spring contacts 40 insulatedly secured to the lower surface of the base frame 13. The upper contact springs 41*a* and 41*b* are each members of a plurality of contact springs, see FIG. 7, attached to strips 42*a* and 42*b*, respectively, having respective terminal studs 43*a* and 43*b*. Each spring 41*a* and 41*b* is provided with buffers 39*a* and 39*b*, respectively. Both springs 41*a* and 41*b* extend perpendicularly from their associated lateral strips. Springs 41*a* are longer than spring 41*b*. One strip 42*a* and one strip 42*b* is provided for each transverse row of pushbuttons and each is embedded transversely into the lower surface of the base frame 13, with terminal studs 43*a* depending from the bottom of the base frame along one side and terminal studs 43*b* depending from the bottom of the base frame along the other side. A spacer plate 48, which has a plurality of slots 49, holds the strips 42*a* and 42*b* embedded in the base frame 13. Each slot 49 is shorter than and associated with either spring 41*a* and 41*b* so as to allow the end of the spring having a buffer to be moved into the slot and to hold the opposite end of the spring firmly against the base frame. The lower contact spring is derived from strip 47 having portions cut out, as shown in FIG. 6, to form a plurality of successive contacts 45*a*, 45*b*, 45*c* and 45*d* having a common terminal stud 46. Two strips 47 are associated with each longitudinal column of pushbuttons. Strips 47 are placed longitudinally over plate 48 into the indexing grooves 58 and 59 in the base frame 13. To complete the assembly the bottom cover 57 is placed over the strips 47 and is secured to the base frame.

Figure 4:
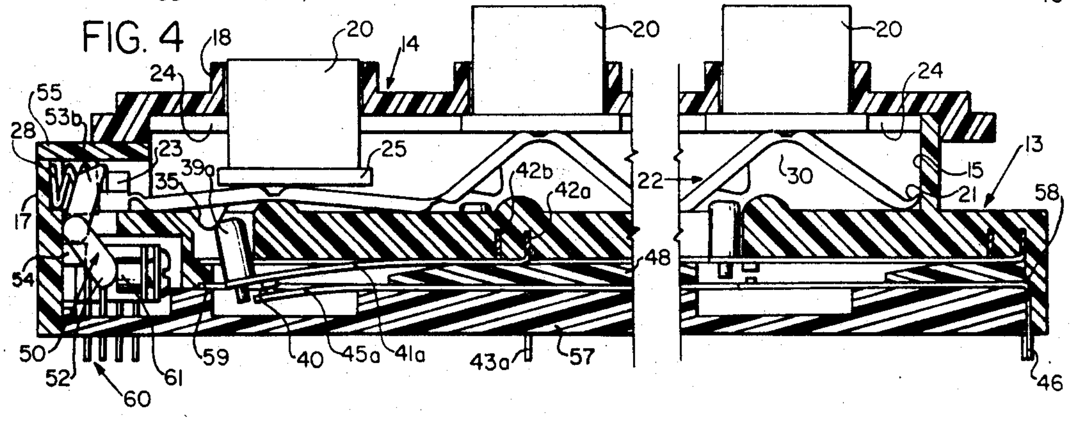
FIG. 4 is an enlarged cross-sectional view corresponding to FIG. 3, except that it is modified to show one pushbutton in its operated position.

Returning now to FIG 4, which shows in cross-section one pushbutton depressed and other pushbuttons in the same column in the normal unoperated position, a better understanding of the operation of the calling device can be had. Depression of the pushbutton 20 applies a force to the knee 32 which tends to straighten the slide, causing legs 33 and 34 to approach a nearly horizontal position. However, the legs 33 and 34 are prevented from reaching a straight line position by a proturberance or boss 70 on the base frame 13. This precludes the locking of the legs 33 and 34 in the stright line position, and insures each return of the toggle joint to its normal position.

Since end 21 of the slide is secured against movement and is spring loaded at the other end, upon being straightened by depression of a pushbutton, the slide 22 moves horizontally towards wall 17 compressing spring 28. Cams 53*a* and 53*b* of the actuator 50 are also pushed toward wall 17, rotating actuator shaft 51 and actuating the common switch 60. The two cams 35 of the depressed toggle joint 30 engages the buffers 39*a* and 39*b* of two associated contact springs 41*a* and 41*b* and depresses them sufficiently to close two sets of frequency selecting contacts 40. Accordingly, at the terminals 43*a*, 43*b* and 46, which may be wired to an appropriate oscillator circuit, (not shown) provide an indication representative of the digit associated with the depressed pushbutton.

Upon release of the pushbutton the return spring 28 restores the depressed toggle joint 30 to its normal position. The spring of the common switch 60, having a buffer 61, returns actuator 50 to its normal position, and the pretensioned spring 41*a* opens contact 40. The next digit, if required, can now be selected and generated by the depression of the proper pushbutton and the operation as described above is repeated.

While the principles of the invention have been described in connection with a specific apparatus, it is to be understood that this description is by way of example and is not intended as a limitation of the scope of the invention.

What is claimed is:

1. A pushbutton controlled mechanism comprising:

an elongated base having a plurality of longitudinally oriented channels formed therein each closed at one end by a wall; a cover secured to said base and having a plurality of apertures therein arranged in an array of longitudinal columns aligned with corresponding ones of said channels and transverse rows;

a pushbutton slidably inserted in each of said apertures;

a flat articulated slide member positioned in each of said channels, each slide member having a plurality of toggle joints each formed by first and second legs flexibly connected together to form a knee, each said toggle joint knee being aligned with and engaging the inner end of a respective pushbutton and the toggle joints intermediate the knees being slidably moveable along said channel, one end of each slide member being secured against movement by said wall, each first leg of each of said toggle joints having first and second cams integrally formed on the inside surface thereof;

a return spring engaging the other end of each slide member and normally biasing said slide member toward said wall thereby to contract its length and urge said toggle joint knees into contact with their respective pushbuttons whereby depression of a pushbutton tends to straighten the toggle joint knee associated therewith and to move it toward said other end to compress said return spring, said return spring being operative to restore said slide member to its normal position upon release of the pushbutton;

a spring contact pileup secured to said base at said other end of said slide member;

a rotatable contact actuator supported on said base and operative upon movement of said other end of any one of said slide members toward its respective return spring to actuate said spring pileups; and at least one pair of contact springs secured to the underside of said base, one spring of each pair having a buffer secured thereto, said buffers protruding through respective apertures in said base and each aligned with a respective slide cam, said cams engaging a respective buffer upon depression of a pushbutton and straightening of the associated knee of a slide member to close said contacts.

2. A pushbutton controlled mechanism comprising: a cover member having a plurality of holes therein arranged in a row; a like plurality of pushbuttons each slidably inserted in a respective hole in said cover member; a base member secured to the underside of said cover member and having an elongated channel formed in the upper surface aligned with said row of holes in said cover member, said channel having a wall at each end thereof and being closed by said cover member; a flat articulated slide having a plurality of toggle joints slidably mounted within said channel, said slide being anchored against longitudinal movement at one end and being urged toward said one end by a return spring at the other end to a position in which alternate ones of said toggle joints engage respective ones of said pushbuttons, said slide being operable in response to depression of a pushbutton onto its associated toggle joint to move in the direction of said other end, and to be restored by said return spring to thereby restore the depressed pushbutton to its upward position, and a plurality of protuberances on the bottom surface of said channel in vertical alignment with respective ones of said pushbuttons, said protuberances having a vertical height sufficient to limit the depression of said pushbuttons to prevent a depressed toggle joint from locking in a straight position.

References Cited

UNITED STATES PATENTS

| | | |
|---|---|---|
| 2,320,774 | 6/1943 | Flynt. |
| 2,855,632 | 10/1958 | Croce et al. |
| 3,109,071 | 10/1963 | Mitchell et al. |
| 3,120,584 | 2/1964 | Grunfelder et al. |
| 3,205,318 | 9/1965 | Bilek. |
| 3,227,819 | 1/1966 | Winther. |
| 3,341,791 | 9/1967 | Leonard. |

FOREIGN PATENTS

| | | |
|---|---|---|
| 164,786 | 2/1956 | Sweden. |

ROBERT K. SCHAEFER, Primary Examiner

ROBERT A. VANDERHYE, Assistant Examiner

U.S. Cl. X.R.

179—90.3; 200—159, 166